(12) United States Patent
Soh

(10) Patent No.: US 8,250,275 B2
(45) Date of Patent: Aug. 21, 2012

(54) SECURE MMC STANDARD SMARTCARD WITH MULTI-APPLICATION OPERATION CAPABILITY, PROCESS OF OPERATION

(75) Inventor: Kian Teck Soh, Singapore (SG)

(73) Assignee: Cassis International Pte. Ltd., Singapore (SG)

( * ) Notice: Subject to any disclaimer, the term of this patent is extended or adjusted under 35 U.S.C. 154(b) by 521 days.

(21) Appl. No.: 12/312,895

(22) PCT Filed: Nov. 30, 2007

(86) PCT No.: PCT/IB2007/003715
§ 371 (c)(1),
(2), (4) Date: May 29, 2009

(87) PCT Pub. No.: WO2008/065524
PCT Pub. Date: Jun. 5, 2008

(65) Prior Publication Data
US 2010/0088447 A1    Apr. 8, 2010

(30) Foreign Application Priority Data
Nov. 30, 2006  (EP) .................................. 06301198

(51) Int. Cl.
*H05K 7/10*  (2006.01)

(52) U.S. Cl. .................. 710/301; 710/315; 710/305

(58) Field of Classification Search .......... 710/301–306, 710/315; 726/17
See application file for complete search history.

(56) References Cited

U.S. PATENT DOCUMENTS

| | | | | |
|---|---|---|---|---|
| 6,098,891 | A * | 8/2000 | Guthery et al. ................ | 235/492 |
| 6,247,644 | B1 * | 6/2001 | Horne et al. ................... | 235/380 |
| 6,886,083 | B2 * | 4/2005 | Murakami ..................... | 711/156 |
| 7,127,529 | B2 * | 10/2006 | Montgomery et al. ............ | 710/1 |
| 2001/0000814 | A1 * | 5/2001 | Montgomery et al. ......... | 710/10 |
| 2005/0229247 | A1 * | 10/2005 | Ishidera .......................... | 726/17 |

* cited by examiner

*Primary Examiner* — Brian Misiura
*Assistant Examiner* — Kim Huynh
(74) *Attorney, Agent, or Firm* — James R. Klaiber; Pryor Cashman LLP

(57) ABSTRACT

The invention relates to smartcard under SecureMMC standard, the card being connected to a host through a MMC bus and being compliant to ISO/IEC7816 standard. According to the invention, the card is multi-application operation capable and a determined number N of commands can be processed in the card in parallel, being the number of logical channels the card can support, the card has means for using a command or a response which is encapsulated in an information field of a bloc frame, said bloc frame also having at least a prologue field for at least identifying the source node application and the destination node application in a NAD datum, and the card has means for as long as the number p of active commands in the card is lower than N and none is completed, the card is in Secure_Idle state.

9 Claims, 3 Drawing Sheets

STATE OF ART

SECURE MMC STANDARD SMARTCARD WITH MULTI-APPLICATION OPERATION CAPABILITY, PROCESS OF OPERATION

CROSS-REFERENCE TO RELATED APPLICATIONS

This application claims priority to PCT Application PCT/IB2007/003715, filed Nov. 30, 2007, and EPO Application 06301198.5, filed Nov. 30, 2006, the disclosures of which are incorporated herein by reference.

FIELD OF THE INVENTION

This invention describes a new way of operating an MMC device, based on the current SecureMMC 2.0 Interface Layer specification and that remove said constraint and allow multiple applications on the device to execute in parallel.

BACKGROUND OF THE INVENTION

Current invention relates to smartcard and more particularly to multimedia cards (MMC) under SecureMMC standard. It allows starting, running and querying multiple applications in parallel/concurrently in a card connected to a host through a MMC bus. It has applications in the electronic, computing and telecommunication industries where MMC cards compliant with SecureMMC standard are fabricated and used.

The newly defined SecureMMC 2.0 protocol defines a method for APDU commands to be transported over the MMC bus using the MMC protocol. However, while keeping as close as possible to the current ISO7816 specification, limitations with respect to the logical channel management as specified in ISO7816 4 is also inherited.

While logical channel management as specified in ISO7816 4, allows for multiple applications to be running in parallel at the same time, the T=0 and T=1 transport protocol as specified in ISO7816 3, allow only one command to be send to one of the application at any one time (T=0 is the asynchronous half duplex character transmission protocol and T=1 is the asynchronous half duplex block transmission protocol). Thus even though multiple application are active, at any one time, only one of them is running.

For a device operating system that supports both logical channel and multithreading, the above constraints does not allow for efficient use of the device.

SUMMARY OF THE INVENTION

The invention is about a smartcard under SecureMMC standard, the card being connected to a host through a MMC bus, exchanges of commands/responses between the card and the host being compliant to at least one standard of the ISO/IEC7816 family of standards, the command and response being in the form of Application Protocol Data Unit (APDU) instructions, the card, in mono-application operation, having means for processing one command sent from the host to the card with a WRITE_SEC_CMD instruction, the card having means for providing a response to the host related to the processed command when receiving from the host a READ_SEC_CMD read instruction, the card having means for setting and resetting a SEC_CARD_EVENTS bit in a status register of the card as a mean to inform the host the processing of the command is completed, said bit being set when the card has completed the processing of the command and said bit being reset when the host has read the card, the card having states with at least:

a Secure_Idle state when the card is waiting for data or command and not in error, a Secure_In_Progress state while processing a command, a Secure_Data_Available state when processing is completed.

According to the invention, the card is multi-application operation capable and a determined number N of commands can be processed in the card in parallel, said predetermined number N of commands the card can proceed in parallel being the number of logical channels N the card can support, the card has means for using a command or a response which is encapsulated in an information field of a bloc frame, said bloc frame also having at least a prologue field for at least identifying the source node application and the destination node application in a NAD datum, in the case of a command the source identified being the host application identity and the destination identified being the related card application identity, and in the case of a response the source identified being the card application identity and the destination identified being the related host application identity, and the card has means for: as long as the number p of active commands in the card is lower than N and none is completed, the card is in Secure_Idle state, an active command being a command which is being processed, and that when the number p of active commands in the card is equal to N, the card switch to Secure_In_Progress state, the completion of any command switching the card to Secure_Data_Available state, a transition from Secure_Idle state to Secure_Data_Available state being added and a transition from Secure_Data_Available state to Secure_Data_Available state being added.

The commands such as READ/WRITE_SEC_CMD... are part of the SecureMMC 2.0 standard (and of its variations) as defined in the Interface layer specification issued by the MMCA Technical Committee. More precisely, READ/WRITE_SEC_CMD are MMC command set and for the commands which are used in the invention, WRITE_SEC_CMD: Write Token is a mean to package APDU command over the MMC line and READ_SEC_CMD: Read Token is a mean to retrieve APDU command response from the card through MMC line.

Following means, possibly used in all possible technical combinations, are also considered in the invention:

the smartcard has means for the bloc frame encapsulating a command or a response also to have an epilogue field, the epilogue field is reserved for future use, RFU, and is 0000 h (two bytes/characters long), the smartcard has means for the prologue field also to have a length field, the smartcard has means for the bloc frame encapsulating a command or a response to have:

the prologue field made of a NAD one byte datum and of a length two bytes datum, the information field of at least one byte, and the epilogue field of two bytes, the smartcard has means for the NAD one byte datum to have four bits for the identification of the destination node application and four bits for the identification of the source node application, the identifications of the source node application and the destination node application are numbers, the smartcard has means for switching from mono-application operation to multi-application operation and reverse in response to a Protocol_Type_Selection (PTS) request, said sent from the host to the card with a WRITE_SEC_CMD, being three bytes long with an initial PTSS character equal to FFh, a PTS0 character storing the protocol identification, its four most significant bits being null, and a checksum PCK character equal to PTSS xor PTS0, the smartcard has means for informing the host that it is multi-application operation capable along with the data sent from the card to the host after the card is reset, the smartcard has means for processing multiple commands which are encapsulated in an information field of one bloc frame, the smartcard has means for sending multiple responses back to the host and which are encapsulated in an information field of one bloc frame.

BRIEF DESCRIPTION OF THE DRAWINGS

Features and other aspects of embodiments of the present invention are explained in the following description taking in conjunction with the accompanying drawings, wherein.

DETAILED DESCRIPTION

Various embodiments of the present invention will now be described in greater detail with reference to the drawings.

Thanks to the new APM command set protocol of the invention, multiple APDU commands can be serviced in parallel and individual (or multiple) responses to be transmitted to the host asynchronously. The advantage is that if a multi threaded OS is present in the device, its resource can be used much more efficiently. This will also enable multiple applications on the host to communicate with the device more efficiently.

The core benefit of the invention is full utilization of multiple logical channels. The invention leverages on the increased bandwidth and robustness of more recent transport protocols and increased processing power of present microprocessors allowing for more applications to exist and run seemingly concurrent to each other. Thanks to the invention, an inherent abstraction between the transport protocol and the logical channel address mechanism is obtained.

The general principles of known operation of smartcards under the SecureMMC 2.0 interface specification are now described. This known operation only allows mono-application operation of the smartcard. The SecureMMC 2.0 interface specification specify a method in which smartcard commands and responses are to be transported over the MMC bus. The specification specify the MMC commands, registers and state machine which a SecureMMC compliant device has to follow.

An Application Protocol Data Unit (APDU) command is transmitted from the host to the SecureMMC compliant device (a smartcard in the current instance) through the WRITE_SEC_CMD: Write Token command. The response and status code of the command is retrieved by the host through the READ_SEC_CMD: Read Token command. The data in both command and response are formatted in accordance to ISO7816 4, as depicted in the following representation of the APDU data format:

| CLA | INS | P1 | P2 | P3 | DATA (P3 bytes) |

(CLA stands for Class Byte, INS for Instruction Byte, P1-P3 for Parameter bytes)

and of the APDU response format:

| DATA | SW1 | SW2 |

(SW1-SW2 stands for Status Bytes)

Figure 1:
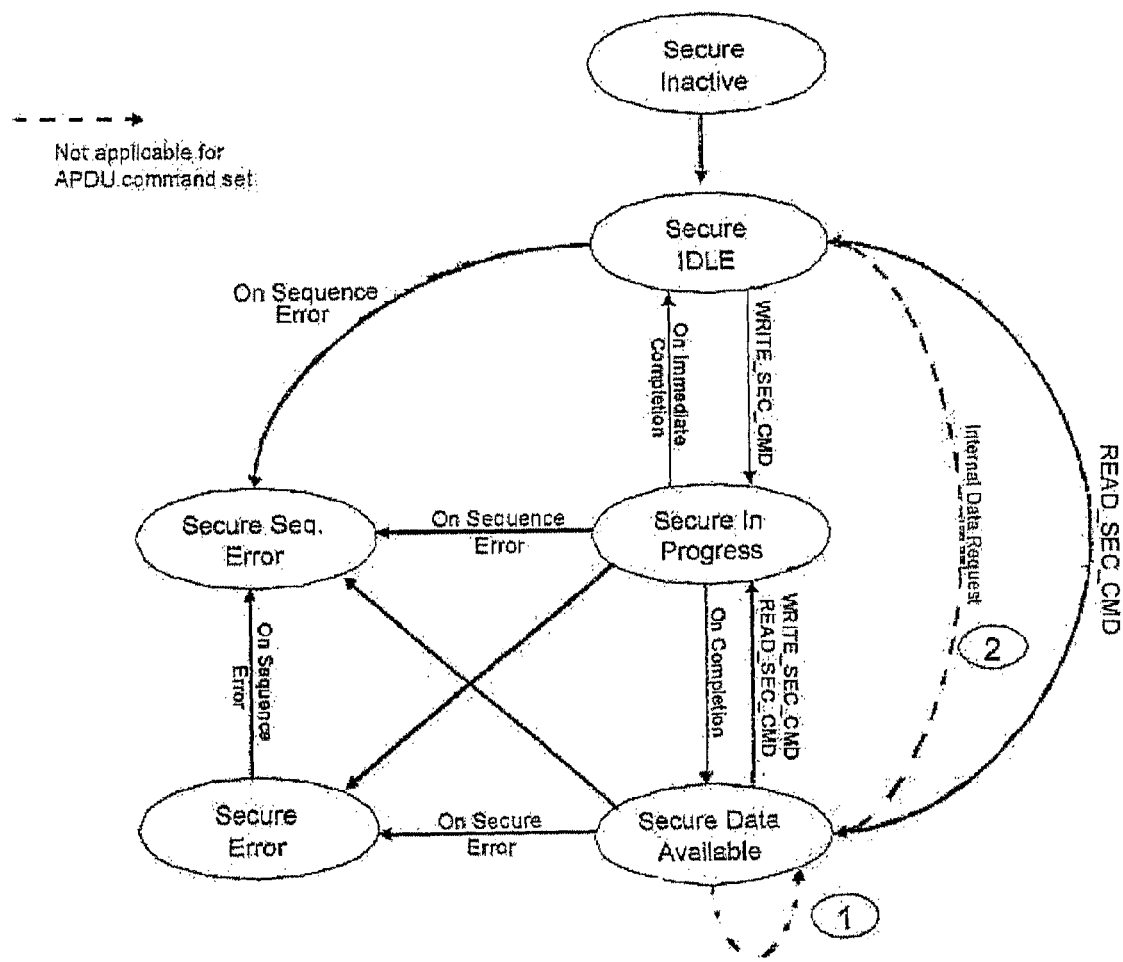
FIG. 1 illustrates the known state of art represents the internal SecureMMC states and state transitions.

The state transition for APDU command set as specify in the SecureMMC 2.0 interface specification is represented in FIG. 1 of the known state of art.

In a partial explanation of FIG. 1, mostly related to command and response activities, the host shall first send a APDU command over to the SecureMMC compliant device. Upon receiving the command, the SecureMMC compliant device will switch its internal state to Secure_In_Progress, meaning the device is processing the command and thus not able to accept new commands. Upon completion of the command, the device will move the state to Secure_Data_Available. A SEC_CARD_EVENT bit in the card status register will also be set by the device as a mean to notify the host that processing is completed and that the host can retrieve the response and status code.

The host shall then issue a READ_SEC_CMD: Read Token to retrieve the response and status code of the previous completed command. The SecureMMC compliant device shall then set its internal state back to Secure_Idle, ready to receive the next APDU command from the host. In this workflow which follows ISO7816 4, only one APDU command can be sent and serviced at any one time.

It should be noted that logical channel as described in ISO7816 4, allows multiple applications to be active at any one time. However, due to the constraint of the T=0 and T=1 protocol as specified in ISO7816 3, only one command can be sent and executed by an application at any one time. As a consequence, with more advanced OS that supports multi threading, the logical channel behavior, as is defined in ISO7816 4, is inhibiting and thus not able to fully exploit a multi threaded capable OS.

It should also be noted, as represented in FIG. 1, that transition 1 (Secure_Data_Available to Secure_Data_Available) and transition 2 (Secure_Idle to Secure_Data_Available) are provisioned to apply to the MMC Net command set and Socket Transport Protocol command set where the data transported over the SecureMMC interface layer follows network protocols and this is per se no help for multi-application.

As this will now be described, the current invention allows the packing of multiple APDU command or response in a single WRITE_SEC_CMD and READ_SEC_CMD respectively. The new way of operating SecureMMC device also allows individual responses to be sent independently, thus not requiring the number of responses to match the WRITE_SEC_CMD. Thus faster applications need not wait for the slower one before their responses can be sent out to the host.

The new operation which is a multi-application operation, also allow host application(s) to send multiple WRITE_SEC_CMD asynchronously for the APDU command set, while keeping to the same secure states but with the addition of state transitions for APDU command which are similar to the ones used for MMC Net command set and Socket Transport Protocol command set.

A method for the host to query the device/card whether the new protocol is supported or not and to switch to this protocol if both the host and card supports it, will also be described. Lastly, a method for the host to query the card of the maximum number of concurrent applications (parallel executing applications) that can be executed, thus limiting the maximum number of APDU commands in a single WRITE_SEC_CMD, will be presented.

In the multi-applications operation, the number of logical Channels limits the number of parallelizable applications in the device/card. The definition of logical channels is the same as defined in ISO7816 4 and logical channel management is as specified in ISO7816 4. This provides a means for the host to select multiple applications on the device. The maximum number of logical channels supported by the device is device-dependent. The maximum number of logical channels supported by the device can be embedded into the historical bytes of the Answer To Reset ATR, as specify in ISO7816 4 and the host may retrieve this information as described in SecureMMC 2.0 Interface specification, that is, through the GET_DATA command. In a variation, the maximum number of logical channels supported by the device may be sent to the host in response to a reset of the card. This information is available through the coding of the card capability byte of the historical bytes in the ATR.

To allow multiple APDU commands to be packaged and directed to the correct on device application and for their responses to be identified and returned to the correct host application, this invention apply a variant of the T=1 block frame, as specified in ISO7816 3, as a way to wrap individual APDU command and responses. Multiple APDU commands and responses are then transmitted in WRITE_SEC_CMD and READ_SEC_CMD as a concatenation of the frames.

The proposed block frame for each individual APDU command and response is depicted in the following table:

| Prologue field | | Information field | Epilogue field |
|---|---|---|---|
| NAD | LEN (2 bytes) | APDU command(s) or response(s) (>=1 byte) | RFU (0000h) |

(NAD stands for Node Address, LEN for length, RFU for reserved for future use)

In this table, each APDU command and response is now encapsulated in a block frame consisting of 3 bytes of header (Prologue field) and 2 bytes of trailer (Epilogue field).

The NAD has similar meaning as described in ISO7816 3. The NAD allows to identify the source and the intended destination of the block. The format of NAD is shown in the following table:

| B8 | B7 | B6 | B5 | B4 | B3 | B2 | B1 |
|---|---|---|---|---|---|---|---|
| | destination node addr | | | | source node addr | | |

If the Information field contains APDU command(s), then the source node addr identify the application on the host side and the destination node addr identify the application residing on the device/card. If the Information field contains responses, the reverse apply.

The node address to identify an on device/card application may be the logical channel number assigned or opened by the host application.

With multiple applications running in parallel and independently in the device and to allow APDU command(s) for the applications to be send independently, the state transitions for APDU command set is expanded.

Figure 2:
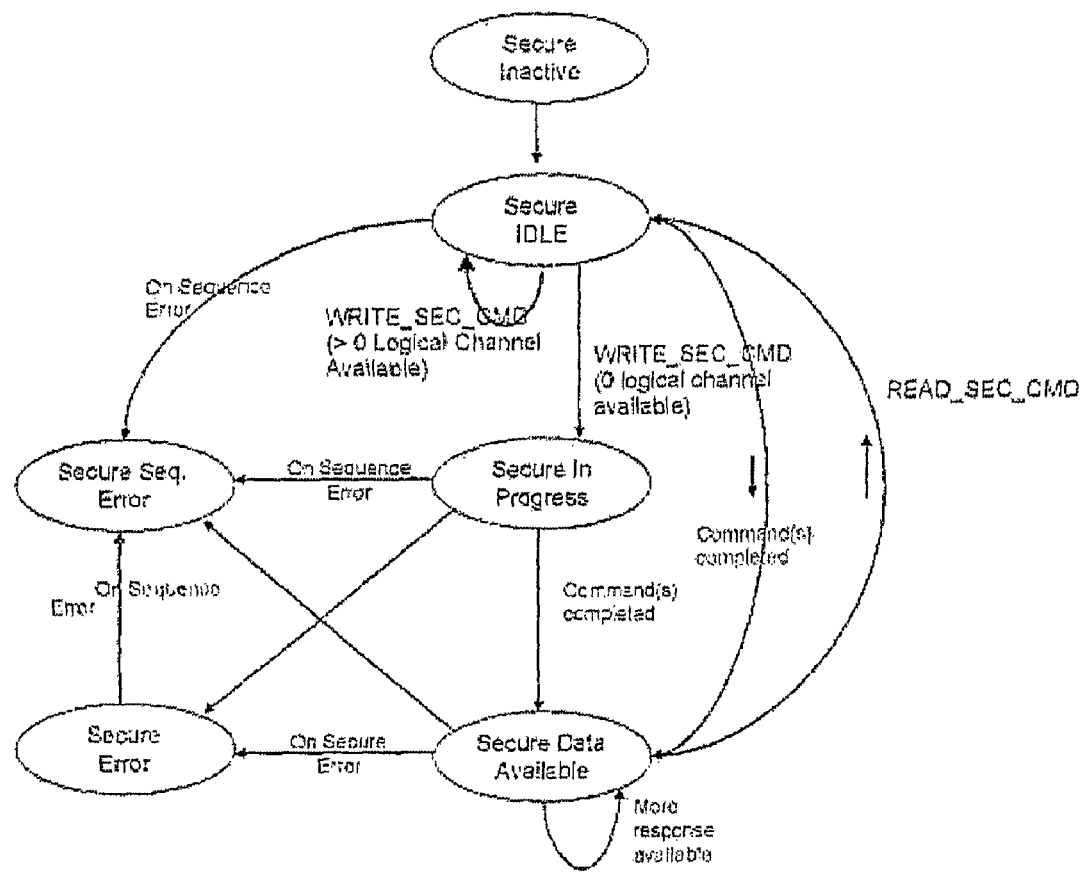
FIG. 2 illustrates the internal SecureMMC states and state transitions for the multi-applications operation according to the invention.

The new state transitions for SecureMMC APDU command set is as shown in FIG. 2. Essentially, the state transition (1) and (2) of FIG. 1 are included as valid transitions for SecureMMC APDU command set of the multi-application operation.

The meaning of Secure_Idle state now means that one or more logical channel (device application) are free to receive APDU commands. Secure_Data_Available state means response for one or more commands are available for the host. As the responses for the commands will be ready in different time and to allow the response to be sent asynchronously, the state transition Secure_Idle to Secure_Data_Available is added. And since it is also possible that while the host send a READ_SEC_CMD to retrieve the response(s), responses for other applications are ready. Thus after a READ_SEC_CMD, the state remains at Secure_Data_Available.

Figure 3:
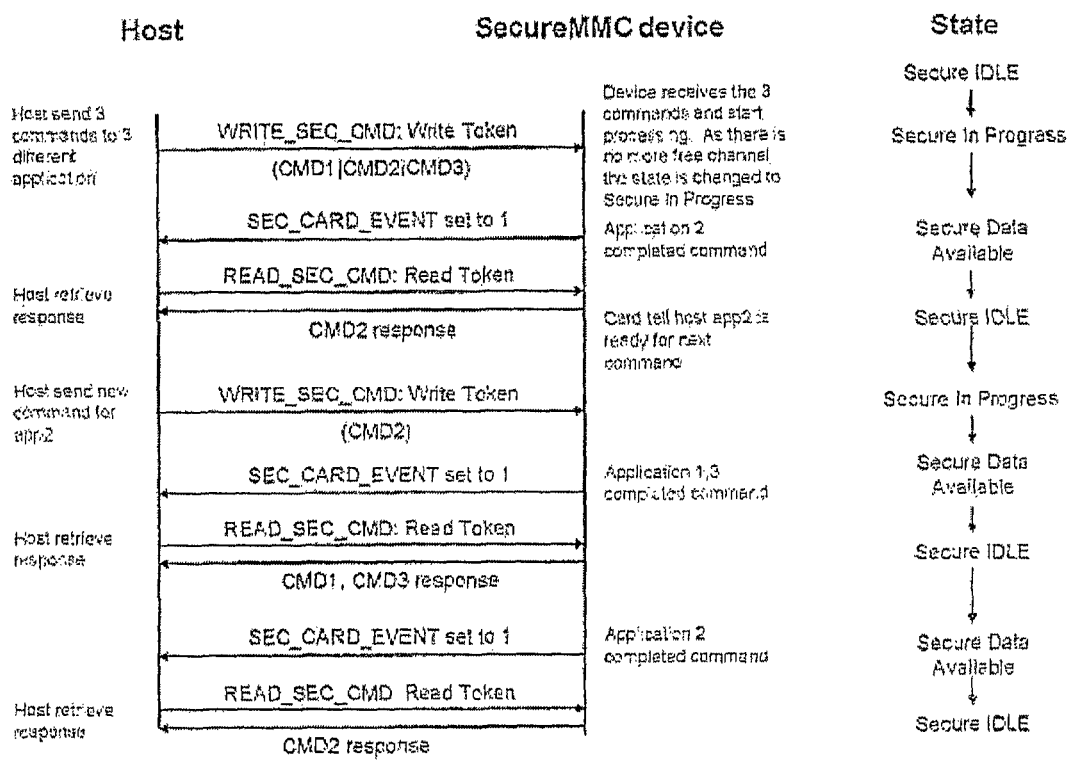
FIG. 3 illustrates an example of state transitions in multi-applications operation of SecureMMC.

FIG. 3 illustrates a sample state transitions. The scenario assumes that the device is able to support a maximum of 3 parallel Channels.

As not all device OS supports multi threading or logical channel management, the new operation protocol as described in this document is meant as a second protocol. The default protocol is as specified in the SecureMMC Interface Layer, that is mono-application.

In order for the host to know if this new protocol is supported, the described protocol id may be coded in the ATR (Answer To Reset), as specified in ISO7816 3. The host shall retrieve the ATR to see if a device supports this new protocol.

To switch to the new protocol, the host shall send a PTS request to the device/card. The PTS request (and response) shall be coded as specified in ISO7816 3, as shown in the following table:

| PTSS | PTS0 | PCK |
|---|---|---|
| character FFh | Format character | =PTSS xor PTS0 |

The most significant four bits of PTS0 being null and the four least significant being the Protocol identification.

Note that the PTS request shall be sent as the only command in the WRITE_SEC_CMD. The card shall respond with the exact pattern to acknowledge a successful protocol switching.

As the PPS request is only 3 bytes long, the card is able to interpret it as a PTS request.

Once the protocol is switched to the new protocol (multi-operation) as described in this document, the message format shall follows the one as described in this document.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

The invention claimed is:

1. A system for operating a smartcard with an MMC device, the system comprising:
   a smartcard, conforming to the SecureMMC standard, and having:
   a processor;
   an MMC bus;
   a host;
   said smartcard connected to said host through said MMC bus;
   said smartcard and said host adapted to exchange commands and responses between each other, said commands and said responses being compliant to at least one standard of the ISO/IEC7816 family of standards;
   said command and said response being in the form of Application Protocol Data Unit (APDU) instructions, said smartcard capable of servicing multiple APDU commands at one time, whether said commands are sent synchronously or asynchronously;
   said processor of said smartcard, in mono-application operation, adapted to process one command sent from said host to said smartcard with a WRITE_SEC_CMD instruction;
   said smartcard adapted to receive from said host a READ_SEC_CMD read instruction and adapted to respond to said host;
   wherein a single of said WRITE_SEC_CMD instruction or said READ_SEC_CMD instruction is capable of packaging multiple APDU commands;
   said smartcard adapted to set and reset a SEC_CARD_EVENTS bit in a status register of said smartcard to inform said host that a command has been processed, said bit being set when said smartcard has completed processing a command and said bit being reset when said host has read said smartcard;
   said smartcard adapted to have a Secure_Idle state when said smartcard is waiting for data or a command and not in error, a Secure_In_Progress state while processing a command, and a Secure_Data_Available state when processing is completed,
   wherein the smartcard is capable of simultaneous multi-application operation and a determined number N of commands may be processed in said smartcard in parallel,
   said predetermined number N of commands said smartcard can proceed in parallel being the number of logical channels N said smartcard can support;
   said processor of said smartcard adapted to process a command or a response encapsulated in an information field of a bloc frame, said bloc frame also having a prologue field for identifying the source node application and the destination node application in a NAD datum, in the case of a command the source identified being the host application identity and the destination identified being the related card application identity, and in the case of a response the source identified being the card application identity and the destination identified being the related host application identity;
   wherein said processor is adapted to simultaneously process multiple commands which are encapsulated in an information field of said bloc frame and to simultaneously send multiple responses back to said host, so as to allow more than one command to be sent at any one time and allow multiple applications to be active at any one time, so that faster applications need not wait for slower applications, running at the same time, before its responses can be sent to said host;
   said smartcard adapted to enter said Secure_Idle state when the number of active commands in the card is lower than N, and none of said active commands are completed;
   said smartcard adapted to enter said Secure_In_Progress state when the number of active commands in the card is equal to N;
   said smartcard adapted to enter said Secure_Data_Available state upon the completion of any command;
   said smartcard adapted to have a transition from said Secure_Idle state to said Secure_In_Progress state; and
   said smartcard adapted to have a transition from said Secure_In_Progress state to said Secure_Data_Available state.

2. The system of claim 1, wherein said bloc frame encapsulating a command or response is adapted to contain an epilogue field.

3. The system of claim 1, wherein said prologue field is adapted to have a field length.

4. The system of claim 1, wherein said bloc frame encapsulating a command or a response is adapted to have:
   a prologue field of a one byte NAD datum and a two byte length datum;
   an information field of at least one byte; and
   an epilogue field of two bytes.

5. The system of claim 4, wherein said NAD one byte datum is adapted to have four bits for the identification of the destination node application and four bits for the identification of the source node application.

6. The system of claim 1, wherein said smartcard is adapted to receive from said host a Protocol_Type_Selection (PTS) request; said smartcard is adapted to switch from mono-application operation to multi-application operation when receiving said PTS request; said smartcard is adapted to switch from multi application operation to mono-application operation when receiving said PTS request; said PTS request is sent from said host with a RITE_SEC_CMD command; said WRITE_SEC_CMD command being three bytes long and having an initial PTSS character equal to FFh, a PTSO character storing the protocol identification, its four most significant bits being null, and a checksum PCK character equal to PTSS or PTSO.

7. The system of claim 1, wherein said smartcard is adapted to inform said host that said smartcard is multi-application operation capable along with the data sent from the card to the host after the card is reset.

8. A method of operating a smartcard under the SecureMMC standard comprising:
   a. connecting the smartcard to a host through a MMC bus;
   b. exchanging simultaneous commands and responses between said smartcard and said host, said commands and said responses being compliant to at least one standard of the ISO/IEC7816 family of standards and being in the form of Application Protocol Data Unit (APDU) instructions, said smartcard capable of servicing multiple APDU commands at one time, whether said commands are sent synchronously or asynchronously;
   c. processing, on a processor of said smartcard, in mono-application operation, one command sent from said host to said smartcard with a WRITE SEC CMD instruction;
   d. receiving, on said smartcard, a READ_SEC_CMD instruction, wherein a single of said WRITE_SEC_CMD or said READ_SEC_CMD instruction is capable of packaging multiple APDU commands;
   e. setting and resetting a SEC_CARD_EVENTS bit, in a status register of said smartcard, to inform said host that a command has been processed, said bit being set when said smartcard has completed processing a command and said bit being reset when said host has read said smartcard;

f. entering, on said smartcard, a Secure_Idle state when said smartcard is waiting for data or a command and not in error;

g. entering, on said smartcard, a Secure_In_Progress state while processing a command;

h. entering, on said smartcard, a Secure_Data_Available state when processing is completed, characterized in that the smartcard is capable of multi application operation and a determined number N of commands may be processed in said smartcard in parallel, said predetermined number N of commands said smartcard can proceed in parallel being the number of logical channels N said smartcard can support;

i. processing a command or a response encapsulated in an information field of a bloc frame, on said smartcard, said bloc frame also having a prologue field for identifying the source node application and the destination node application in a NAD datum, in the case of a command the source identified being the host application identity and the destination identified being the related card application identity, and in the case of a response the source identified being the card application identity and the destination identified being the related host application, wherein said processor is adapted to simultaneously process multiple commands which are encapsulated in an information field of said bloc frame and to simultaneously send multiple responses back to said host, so as to allow more than one command to be sent at any one time and allow multiple applications to be active at any one time, so that faster applications need not wait for slower applications, running at the same time, before its responses can be sent to said host;

j. entering, on said smartcard, said Secure_Idle state when the number of active commands in the card is lower than N, and none of said active commands are completed;

k. entering, on said smartcard, said Secure_In_Progress state when the number of active commands in the card is equal to N;

l. entering, on said smartcard, said Secure_Data_Available state upon the completion of any command;

m. transitioning, on said smartcard, from said Secure_Idle state to said Secure_In_Progress state; and n. transitioning, on said smartcard, from said Secure_In_Progress state to said Secure_Data_Available state.

9. A smartcard under the SecureMMC standard comprising:

a. means for connecting the smartcard to a host through a MMC bus;

b. means for exchanging simultaneous commands and responses between said smartcard and said host, said commands and said responses being compliant to at least one standard of the ISO/IEC7816 family of standards and being in the form of Application Protocol Data Unit (APDU) instructions, said smartcard capable of servicing multiple APDU commands at one time, whether said commands are sent synchronously or asynchronously;

c. means for processing, on a processor of said smartcard, in mono application operation, one command sent from said host to said smartcard with a WRITE_SEC_CMD instruction;

d. means for receiving, on said smartcard, a READ_SEC_CMD instruction from said host, wherein a single of said WRITE_SEC_CMD instruction or said READ_SEC_CMD instruction is capable of packaging multiple APDU commands;

e. means for setting and resetting a SEC_CARD_EVENTS bit, in a status register of said smartcard, to inform said host that a command has been processed, said bit being set when said smartcard has completed processing a command and said bit being reset when said host has read said smartcard;

f. means for entering, on said smartcard, a Secure_Idle state when said smartcard is waiting for data or a command and not in error;

g. means for entering, on said smartcard, a Secure_In_Progress state while processing a command;

h. means for entering, on said smartcard, a Secure_Data_Available state when processing is completed, characterized in that the smartcard is capable of multi-application operation and a determined number N of commands may be processed in said smartcard in parallel, said predetermined number N of commands said smartcard can proceed in parallel being the number of logical channels N said smartcard can support;

i. means for processing a command or a response encapsulated in an information field of a bloc frame, on said smartcard, said bloc frame also having a prologue field for identifying the source node application and the destination node application in a NAD datum, in the case of a command the source identified being the host application identity and the destination identified being the related card application identity, and in the case of a response the source identified being the card application identity and the destination identified being the related host application identity, wherein said processor is adapted to simultaneously process multiple commands which are encapsulated in an information field of said bloc frame and to simultaneously send multiple responses back to said host, so as to allow more than one command to be sent at any one time and allow multiple applications to be active at any one time, so that faster applications need not wait for slower applications, running at the same time, before its responses can be sent to said host;

j. means for entering, on said smartcard, said Secure_Idle state when the number of active commands in the card is lower than N, and none of said active commands are completed;

k. means for entering, on said smartcard, said Secure_In_Progress state when the number of active commands in the card is equal to N;

l. means for entering, on said smartcard, said Secure_Data_Available state upon the completion of any command;

m. means for transitioning, on said smartcard, from said Secure_Idle state to said Secure_In_Progress state; and n. means for transitioning, on said smartcard, from said Secure_In_Progress state to said Secure_Data_Available state.

* * * * *